United States Patent [19]

Biondetti

[11] 4,111,746

[45] Sep. 5, 1978

[54] ROLLING DEVICE HAVING A CONTROLLED-DEFLECTION ROLL

[75] Inventor: Mario Biondetti, Schio, Italy

[73] Assignee: Escher Wyss Limited, Zurich, Switzerland

[21] Appl. No.: 828,978

[22] Filed: Aug. 29, 1977

[30] Foreign Application Priority Data

Sep. 22, 1976 [CH] Switzerland ............. 11990/76

[51] Int. Cl.² ................. D21F 3/08; D21G 3/00
[52] U.S. Cl. .................. 162/272; 15/256.51; 100/160; 100/162 B; 162/281
[58] Field of Search .................. 162/272, 281; 15/256.51; 100/160, 162 B; 29/116 AD

[56] References Cited

U.S. PATENT DOCUMENTS

| 421,574 | 2/1890 | Johnson | 162/272 |
|---|---|---|---|
| 1,119,816 | 12/1914 | Fogarty | 162/281 X |
| 2,082,819 | 6/1937 | Beccard | 162/272 X |
| 3,087,185 | 4/1963 | Washburn | 15/256.51 |
| 3,802,044 | 4/1974 | Spillman et al. | 29/116 AD |
| 3,885,283 | 5/1975 | Biondetti | 29/116 AD |

Primary Examiner—Richard V. Fisher
Attorney, Agent, or Firm—Werner W. Kleeman

[57] ABSTRACT

A rolling device or roller mill having a controlled-deflection roll possessing a stationary roll support or carrier mounted in a frame of the rolling mill. A tubular roll shell is rotatable about the roll support and bears thereon by means of at least one bearing or support element. The roll shell is provided at its ends with guide members which are rotatably mounted in the roll shell and which are guided on the roll support in the direction of the pressing or disengaging movement of the roll shell. The controlled-deflection roll is equipped with a scraper device having a scraper blade which, during operation, is in contact with the outer surface of the roll shell, the scraper device being rotatably mounted on the frame. At least one of the guide members has a disengaging or lift-off element which, when the roll shell performs a disengaging or lift-off movement from the operative position, abuts a part of the blade support or carrier and raises the blade off the surface of the roll shell.

4 Claims, 4 Drawing Figures

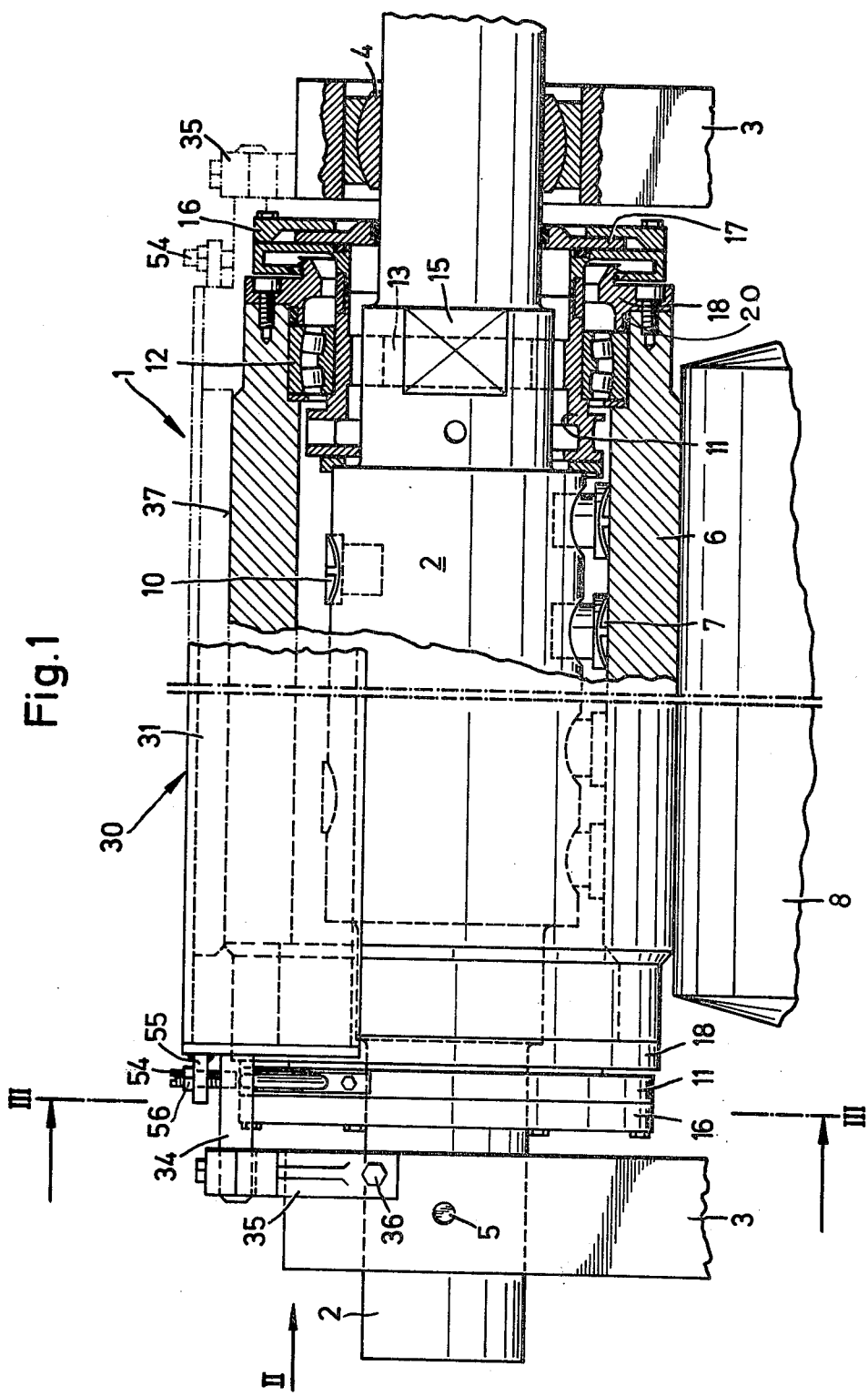

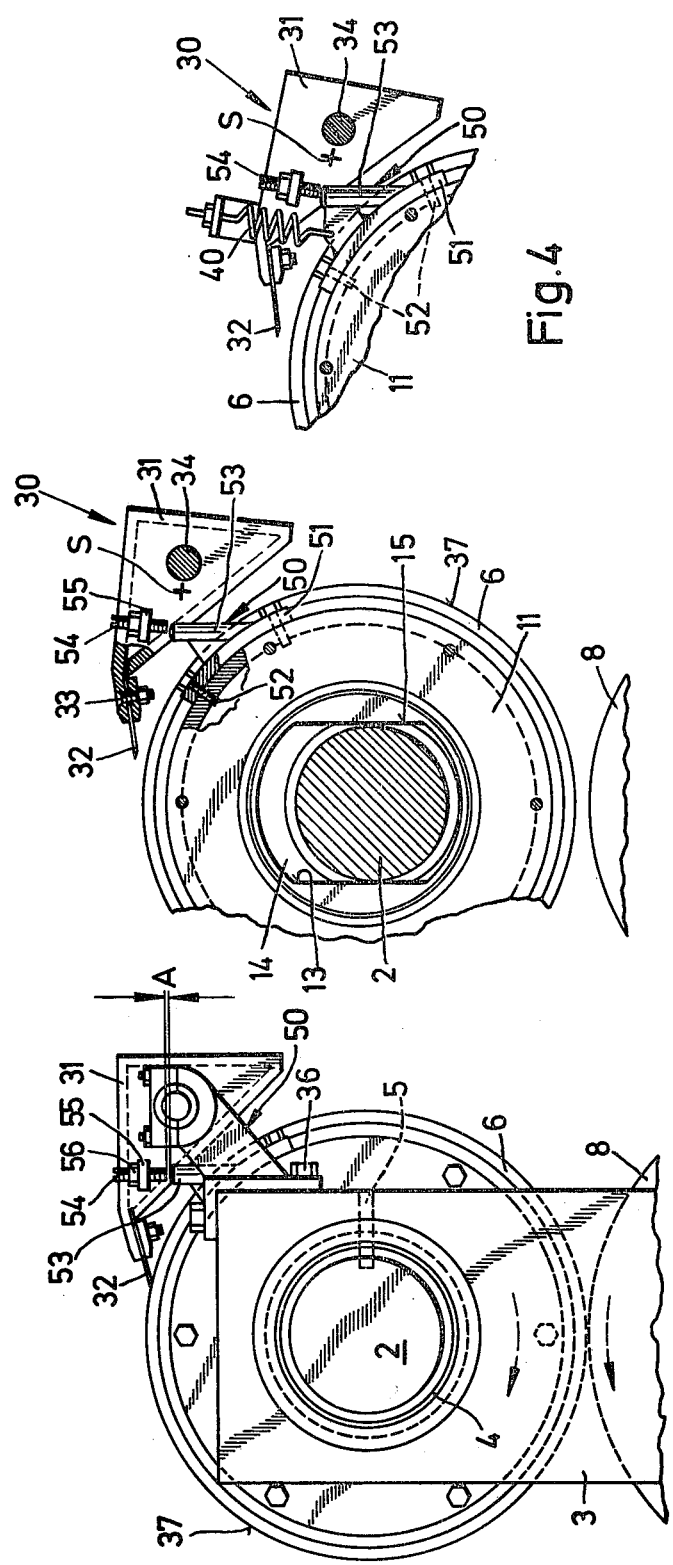

ROLLING DEVICE HAVING A CONTROLLED-DEFLECTION ROLL

BACKGROUND OF THE INVENTION

The present invention relates to a new and improved construction of a rolling device or roller mill having a controlled-deflection roll possessing a stationary roll support or carrier which is mounted in a frame of the roller mill, there also being provided a substantially tubular roll shell which is rotatable around the roll support and which bears thereon by way of at least one bearing or support element, with the roll shell having at its ends guide members which are rotatably mounted in the roll shell and guided on the roll support in the direction of the pressing or contact or disengaging or lift-off movement respectively, of the roll shell.

Controlled-deflection rolls of this type — also referred to sometimes in the art as a roll with bending compensation — are known, for instance, from U.S. Pat. Nos. 3,802,044 and 3,885,283 corresponding to Swiss Pat. Nos. 556,946 and 571,904 respectively. With controlled-deflection rolls of this type, it is possible to compensate for deflection or bending in the roller mill where the rolls cooperate with a backing roll or counter-roll. It is even possible to carry out a desired adjustment of the course of the roll deflection or bending, i.e., the pressing or contact force. Controlled-deflection rolls are therefore increasingly used, for instance, in papermaking machines and in textile processing.

For certain fields of application, for instance in papermaking machines, the controlled-deflection roll must be provided with a scraper device having a scraper blade which scrapes clean the outer surface of the roll shell. This operation helps, for instance, a rolled web to become disengaged from the roll shell or to clean the surface thereof. The scraper blade is accurately adjusted to the outer surface of the roll shell, and the roll surface must be of very high quality, whether it be formed of metal or, for instance, rubber.

Oftentimes, it is also required that the contact or pressing roll, in other words, which ever roll of the pair applies the contact or pressing force, be disengageable from the backing roll so that the roller mill can be opened. In the case of the heretofore known solid rolls possessing an external contact or pressing mechanism, it is common practice for the scraper device to be secured to the roll levers and moved together with the roll.

However, when a controlled-deflection roll of the type referred to is required to be used as a pressing or contact roll, the positioning of the scraper device leads to difficulties, since it can not be mounted in the same manner as it can on solid rolls and the roll support or carrier does not move together with the roll shell.

SUMMARY OF THE INVENTION

Hence, it is a primary object of the present invention to provide an improved construction of a roller mill having a controlled-deflection roll which is not associated with the aforementioned drawbacks and limitations of the prior art constructions noted above.

Another and more specific object of the present invention aims at the provision of a controlled-deflection roll of the character described which solves the aforementioned problem through the use of simple means and, without the use of any complicated devices, enables the scraper device to move in dependence upon the movement of the roll shell.

Now in order to implement these and still further objects of the invention, which will become more readily apparent as the description proceeds, the controlled-deflection roll is provided with a scraper device having a scraper blade which, during operation, is in contact with the outer surface of the roll shell, the scraper device being rotatably mounted on the frame. Further, at least one of the guide members has a lift-off or disengaging element which, when the roll shell carries out a lift-off or disengaging movement from the operative position, abuts a part of the blade support or carrier and raises the scraper blade off the outer surface of the roll shell.

Due to the arrangement of the scraper device as contemplated by the invention, there is ensured that the same automatically moves in the event of any movement of the roll shell relative to the roll support or carrier and therefore relative to the backing roll. Simpler means are used to disengage the scraper blade from the outer surface of the roll shell and there is no risk that the delicate outer surface of the roll shell will become damaged by parts of the scraper device.

Preferably, when the roll shell is in its operative position there may be present a spacing or distance between the lift-off or disengaging member and that part of the scraper blade support or carrier which cooperates with the disengaging member. Consequently, the scraper blade remains in contact with the outer surface of the roll shell in the event of a minor movement of the roll shell, such as may occur during operation, e.g. because of variations in the thickness of the rolled web. In this case, there may be provided an adjusting or adjustment element for adjusting the distance or gap between the disengaging or lift-off member and that part of the blade support or carrier which cooperates with the disengaging member. This enables the distance or gap to be adjusted, with the result that it is also possible to determine the amount of roll shell movement before the scraper blade begins to disengage or lift-off.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is an axial sectional view through a rolling device or roller mill constructed according to the teachings of the present invention;

FIG. 2 is a view looking in the direction of the arrow II of FIG. 1;

FIG. 3 is a partial sectional view, taken substantially along the line III—III of FIG. 1, showing the scraper device in its disengaged or lifted-off position; and FIG. 4 is a detail showing of part of the arrangement of FIG. 3 utilizing another embodiment of the invention.

DETAILED DESCRIPTION OF THE PREFERRED EMBODIMENTS

Describing now the drawings, it is to be understood that in the exemplary embodiment of roller mill or rolling device shown in FIG. 1 only enough of the construction thereof has been illustrated and will be described to enable those skilled in the art to readily understand the underlying concepts of the present invention. Hence, it will be seen that in FIG. 1 the controlled-deflection roll 1 comprises a stationary roll support or carrier 2 mounted in supports 3 of a frame which has not been shown in greater detail but may be conventional. Located in the supports 3 are substantially spherical bearing shells 4 which enable the ends of the roll support 2 to pivot in the supports 3 as a result of deflection or sag of the roll support or carrier 2. Means, such as pin 5, can be provided to prevent the roll support or carrier 2 from rotating in the supports 3.

A roll shell 6 is mounted to be rotatable around the roll support or carrier 2. During operation, the roll shell 6 is supported by means of hydrostatic pressure elements 7 supplied with a hydraulic pressure medium through piping (not shown) as is known. A controlled-deflection roll of this type is taught in U.S. Pat. No. 3,802,044, to which reference may be readily had and the disclosure of which is incorporated herein by reference. The lift-off or disengaging elements 10, which are of identical construction to the pressure elements 7, are provided for the purpose of lifting-off or disengaging the roll shell 6 from a backing roll or counter-roll 8.

As also best seen by referring to FIG. 1, guide members 11 are disposed at the ends of the roll shell 6 and are mounted therein by means of roller bearings 12. As best seen for instance by referring to FIG. 3, the guide members 11 are also provided with parallel guide surfaces 13 in an opening or aperture 14 which extends around the roll support or carrier 2. The roll support 2 is equipped at the corresponding location with parallel guide surfaces 15 which cooperate with the guide surfaces 13. Consequently, the guide members 11 are prevented from carrying out any rotational movement in relation to the roll support or carrier 2, and at the same time the guide members 11 are guided on the roll support 2 in the contact or pressing direction and in the lift-off or disengaging direction, i.e. the force direction of the pressure elements 7 and the lift-off elements 10, and thereby guide the roll shell 6. This type of controlled-deflection roll is known from U.S. Pat. No. 3,885,283, corresponding to Swiss Pat. No. 556,946 to which reference may be readily had and the disclosure of which is incorporated herein by reference.

As also readily seen by referring to FIG. 1, operatively associated with each of the guide members 11 are the closure or end members 16, 17 which serve to seal-off from the outside the space or region between the related guide member 11 and the roll support 2. There are also provided the closure or end members 18 equipped with gaskets or seals 20 which serve to seal the gaps or spaces between the guide members 11 and the roll shell 6.

As best seen by referring to FIGS. 1 and 2, the controlled-deflection roll 1 is equipped with a scraper device 30 comprising a blade support or carrier 31 and a scraper blade 32. This scraper blade 32 is exchangeably or releasably secured to the blade support or carrier 31 by screws 33 or equivalent fastening devices.

At its ends the blade carrier or support 31 has pins 34 rotatably mounted in bearing members 35 secured by threaded bolts 36 or the like to the supports 3 of the frame means. In order to produce a contact or pressing force the axis of the rotatable mounting of the blade carrier 31 in the bearing members 35, i.e. the axis of the pins 34 and the center of gravity S of the blade support or carrier 31 together with the scraper blade 32, can be selected such that the scraper blade 32 is pressed on to the outer surface of the roll shell 37 by the action of gravity. However, and as shown for instance in the modified version of equipment of FIG. 4, there may also be provided springs 40 or other suitable resilient means or equivalent structure for determining the contact or pressing force. These springs 40 can of course be particularly used in those cases where it is difficult, if not impossible, to use gravitational forces for pressing the scraper device 30 into contact with the outer surface of the roll shell.

As can be seen by referring to FIGS. 1 to 3, it is contemplated by the invention, to secure a disengaging or lift-off member 50 to at least one of the guide members 11 and equipped with a flange 51 with the aid of which such disengaging or lift-off member 50 is secured by means of screws 52 or equivalent structure to the outer periphery of the related guide member 11. The lift-off or disengaging member 50 is also equipped with a pin-like or stud-like projection 53 which extends towards the scraper device 30. This scraper device 30, in turn, is equipped with a member or element 54 which is intended to cooperate with the lift-off or disengaging member 50 and which causes the scraper blade 32 to disengage or lift-off from the outer surface 37 of the roll shell in the event such roll shell 6 moves away from the backing roll 8.

As will be especially observed by referring to FIG. 2, the gap or spacing A remains between the lift-off member 50 and the member 54 in the operative position, i.e., when the pressure elements 7 press the roll shell 6 onto the backing roll or counter-roll 8. So that the gap or spacing A can be adjusted the member 54 beneficially takes the form, in the embodiment under discussion, of an adjusting or adjustment screw which is threaded into a flange 55 of blade carrier or support 31 and secured in position by a locknut 56 or equivalent structure.

FIG. 3 shows the position of the scraper device 30 when the rolling mill is open, wherein the roll shell 6 has been disengaged or lifted-off the backing roll 8.

FIG. 4 is a view, similar to the showing of FIG. 3, but here employing springs 40 for determining the force with which the scraper blade 32 presses upon the outer surface 37 of the roll shell 6. These springs 40 can either boost gravity, as shown, or oppose gravity.

Although the controlled-deflection roll equipped with hydrostatic pressure or bearing elements has been described and illustrated as constituting the type disclosed in U.S. Pat. No. 3,802,044, it is to be expressly understood that the principles of the invention are in no way limited to such exemplary embodiment of controlled-deflection roll, and further, the elements can be devised or constructed in any other appropriate form.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A roller mill equipped with a controlled-deflection roll comprising:
   frame means;
   a stationary roll support mounted in said frame means;
   a substantially tubular roll shell;
   means mounting said substantially tubular roll shell to be rotatable around said roll support;
   at least one bearing element for supporting the tubular roll shell upon the roll support;
   said roll shell having opposed ends;

guide members rotatably mounted at the opposed ends within the roll shell and guided on the roll support in the direction of a pressing or disengaging movement, respectively, of the roll shell;

a scraper device provided for said controlled-deflection roll;

said roll shell having an outer surface;

said scraper device possessing a scraper blade which, during operation, is in contact with the outer surface of the roll shell;

means rotatably mounting the scraper device on the frame means;

said scraper device further including a blade support having at least one abutment part;

at least one of the guide members having a lift-off member which, when the roll shell carries out a lift-off movement from the operative position, abuts said abutment part of the blade support and raises the scraper blade off the outer surface of the roll shell.

2. A roller mill equipped with a controlled-deflection roll comprising:

frame means;

a stationary roll support mounted in said frame means;

a substantially tubular roll shell;

means mounting said substantially tubular roll shell to be rotatable around said roll support;

at least one bearing element for supporting the tubular roll shell upon the roll support;

said roll shell having opposed ends;

guide members rotatably mounted at the opposed ends within the roll shell and guided on the roll support in the direction of a pressing or disengaging movement, respectively, of the roll shell;

a scraper device provided for said controlled-deflection roll;

said roll shell having an outer surface; said scraper device possessing a scraper blade which, during operation, is in contact with the outer surface of the roll shell;

means rotatably mounting the scraper device on the frame means;

said scraper device further including a blade support having at least one abutment part;

at least one of the guide members having a lift-off member which, when the roll shell carries out a lift-off movement from the operative position, abuts said abutment part of the blade support and raises the scraper blade off the outer surface of the roll shell;

when said roll shell is in its operative position there is present a gap between the lift-off member and said abutment part of the blade support which cooperates with the lift-off member; and adjustment means for adjusting the gap between the lift-off member and said abutment part of the blade support which cooperates with said lift-off member.

3. The roller mill as defined in claim 2, wherein:

said means rotatably mounting the scraper device on the frame means comprises rotatable mounting means;

said rotatable mounting means having an axis which together with the center of gravity of the blade support and the scraper blade are selected such that the scraper blade is pressed onto the outer surface of the roll shell by the action of gravity.

4. The roller mill as defined in claim 2, further including:

resilient means for producing a pressure by means of which the scraper blade bears against the outer surface of the roll shell.

* * * * *